(12) United States Patent
Nock

(10) Patent No.: US 6,742,845 B2
(45) Date of Patent: Jun. 1, 2004

(54) LOCKING DEVICE FOR A VEHICLE SEAT

(75) Inventor: Eckhard Nock, Worms (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/396,051

(22) Filed: Mar. 25, 2003

(65) Prior Publication Data

US 2003/0160490 A1 Aug. 28, 2003

Related U.S. Application Data

(63) Continuation of application No. PCT/EP02/07770, filed on Jul. 12, 2002.

(30) Foreign Application Priority Data

Jul. 20, 2001 (DE) .......................... 101 35 433

(51) Int. Cl.$^7$ .............................................. B60N 2/42
(52) U.S. Cl. ................................................ 297/378.11
(58) Field of Search .......................... 297/378.11, 367, 297/378.12

(56) References Cited

U.S. PATENT DOCUMENTS

| | | | |
|---|---|---|---|
| 3,848,923 A | * 11/1974 | Dehler | 297/366 |
| 3,999,247 A | 12/1976 | Cremer | |
| 4,118,067 A | * 10/1978 | Tanaka | 297/378.11 |
| 4,147,386 A | * 4/1979 | Stolper | 297/362 |
| 4,634,182 A | * 1/1987 | Tanaka | 297/378.11 |
| 4,659,146 A | 4/1987 | Janiaud | |
| 4,707,010 A | * 11/1987 | Croft et al. | 297/378.11 |
| 4,836,608 A | 6/1989 | Sugiyama | |
| 5,058,240 A | * 10/1991 | Barda et al. | 16/325 |
| 5,154,476 A | 10/1992 | Haider et al. | |
| 5,163,735 A | * 11/1992 | Aljundi | 297/378.11 |
| 5,540,117 A | 7/1996 | Hansel et al. | |
| 5,681,086 A | 10/1997 | Baloche | |
| 5,733,008 A | * 3/1998 | Tame | 297/378.11 |
| 5,762,400 A | 6/1998 | Okazaki et al. | |
| 5,842,744 A | * 12/1998 | Harmon | 297/378.11 |
| 5,882,080 A | * 3/1999 | Houghtaling et al. | 297/378.11 |
| 5,884,972 A | 3/1999 | Deptolla | |
| 6,139,104 A | 10/2000 | Brewer | |
| 6,139,105 A | 10/2000 | Morgos et al. | |
| 6,149,235 A | 11/2000 | Fahim | |
| 6,209,955 B1 | 4/2001 | Seibold | |
| 2002/0008419 A1 | 1/2002 | Boltz et al. | |
| 2002/0170381 A1 | 11/2002 | Hansel et al. | |

FOREIGN PATENT DOCUMENTS

| | | |
|---|---|---|
| DE | 7306501 U | 3/1972 |
| DE | 2 414 910 | 10/1974 |
| DE | 38 28 659 A1 | 3/1989 |
| DE | 195 14 380 A1 | 11/1995 |
| DE | 199 38 881 C1 | 12/2000 |
| DE | 199 29 564 A1 | 1/2001 |
| DE | 101 24 618 A1 | 12/2002 |
| EP | 0 121 452 A1 | 10/1984 |
| EP | 0 738 624 A1 | 10/1996 |
| EP | 0 776 781 A2 | 6/1997 |
| EP | 0 928 717 A1 | 7/1999 |
| FR | 2 649 942 | 1/1991 |
| GB | 2 156 901 A | 10/1985 |
| WO | WO 01/76907 A1 | 10/2001 |

* cited by examiner

*Primary Examiner*—Peter R. Brown
(74) *Attorney, Agent, or Firm*—Alston & Bird LLP

(57) ABSTRACT

A locking device for a vehicle seat, in particular a locking device in an adjuster of a motor vehicle seat, has at least two locking elements (12, 15) which can be moved relative to each other and can be brought into engagement where they are secured by at least one securing element (23) which is mounted in a manner such that the securing device can pivot about a rotational axis (25). The securing element (23) is mounted in a balanced manner.

18 Claims, 1 Drawing Sheet

LOCKING DEVICE FOR A VEHICLE SEAT

CROSS-REFERENCE TO RELATED APPLICATION

This is a continuation of PCT/EP02/07770, which was filed Jul. 12, 2002, published in German, and is entirely incorporated herein by reference.

BACKGROUND OF THE INVENTION

The present invention relates to a locking device for a vehicle seat, in particular a locking device located in an adjuster of a motor vehicle seat, having at least two locking elements which can be moved relative to each other and can be brought into engagement, with the engagement being maintained by at least one securing element which is mounted for pivoting about a rotational axis.

In a known locking device of this type for locking a fitting of a vehicle seat having a backrest which can pivot freely, there is a pivotable detent pawl for locking the fitting upper part, a control cam connected in a rotationally fixed manner to the detent pawl, an intercepting element for supporting the detent pawl in the event of a crash, and a spring-loaded clamping element, which acts on the control cam, for clamping the detent pawl relative to the fitting upper part. The intercepting and clamping elements, which are for acting as securing elements, are mounted pivotably and are provided with suitable active surfaces. In practice, some things remain to be desired, for example with regard to the outlay involved in production.

BRIEF SUMMARY OF THE INVENTION

One aspect of the present invention is the provision of a locking device for a vehicle seat, in particular a locking device located in an adjuster of a motor vehicle seat, having at least two locking elements which can be moved relative to each other and can be brought into engagement where they are secured by at least one securing element that is mounted, in a balanced manner, for pivoting.

By virtue of the securing element being mounted in a balanced manner, i.e. the rotational axis of the securing element runs through its center of gravity, mass forces of inertia do not, in the event of a crash, produce a resulting torque which would cause a moment of momentum, i.e. a pivoting movement, of the securing element. As a result, an acceleration of the securing element, which could have an opening effect on further securing elements via connecting means, is avoided, with the result that the securing element behaves in a manner which is neutral in terms of acceleration. In the case of the known locking devices having securing elements which are mounted outside the center of gravity, the above-mentioned problems may occur, particularly if the securing elements are connected together, and the problems have to be prevented by appropriate, dimensionally accurate machining of the components.

At least one section of material is preferably integrally formed on the securing element as a balancing weight. This integral design is neutral in terms of outlay in the case of production. In order to avoid stresses and fractures if overloaded, the section of material may be of lug-like design with rounded or continuous transitions. For a simpler balancing of masses, two sections of material are preferably provided at the same distance from the rotational axis, specifically, as a rule, with respect to the rotational axis, on the side facing away from the active surface of the securing element. A flat design of the securing element not only saves structural space, but also simplifies the balancing. Preferably taken into consideration as the balanced securing element are clamping and/or intercepting elements which are suitable for clamping and, in the event of a crash, for supporting locking elements designed as pivotable detent pawls.

The locking device according to the invention can be used for various adjusters, i.e. both for rotational adjusters, such as, for example, fittings of vehicle seats having a backrest which can be varied in inclination and/or can pivot freely, and also for linear adjusters, such as, for example, longitudinal adjusters or vertical adjusters in combination with diagonal struts. The locking device according to the invention can also be used for the locking of various positions of a foldable vehicle seat.

BRIEF DESCRIPTION OF THE DRAWINGS

The invention is explained in greater detail below with reference to an exemplary embodiment which is illustrated in the drawings, in which.

DETAILED DESCRIPTION OF THE INVENTION

Figure 1:
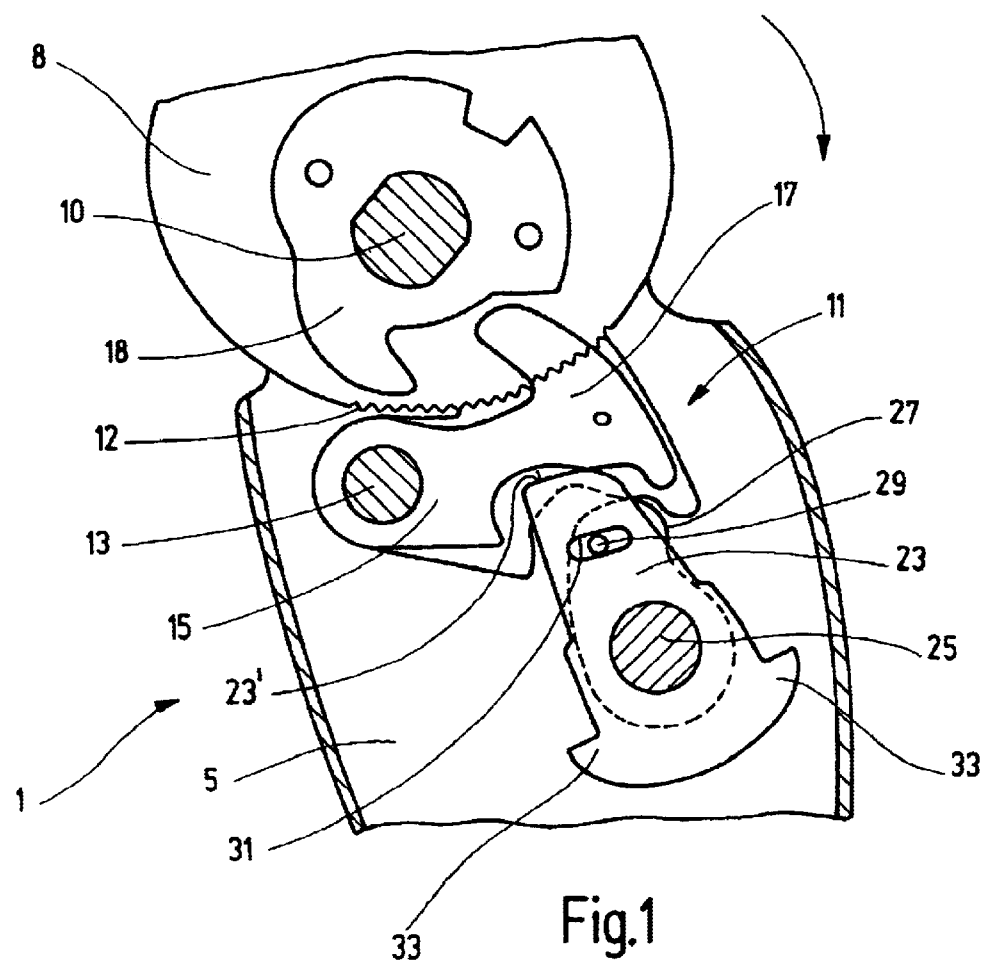
FIG. 1 shows a partial view (illustrated partially in section) of a latching fitting having a locking device according to the invention.
Figure 2:
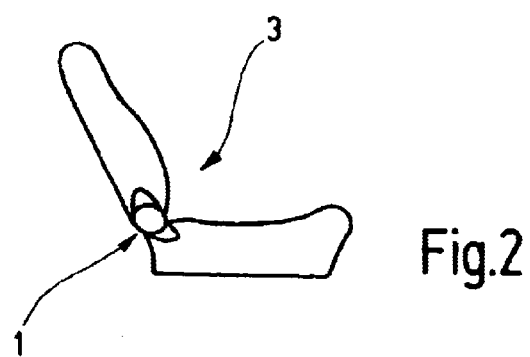
FIG. 2 shows a schematic illustration of a vehicle seat.

A latching fitting 1 for a vehicle seat 3 is provided with a fitting lower part 5 which is fixed on the seat substructure and has two essentially flat plates which are joined together and define a structural space of the fitting lower part 5, and with a flat fitting upper part 8 which is fixed to the backrest structure. The fitting upper part 8 is at least partially arranged within the structural space of the fitting lower part 5 and can be rotated relative to the fitting lower part 5 about a backrest bolt 10. The vehicle seat 3 has two mirror-inverted latching fittings 1 which support the backrest of the vehicle seat 3 in a manner such that it can be adjusted in inclination and pivoted. For a locking device 11, a toothed rim 12, which is curved around the backrest bolt 10, is provided on the fitting upper part 8, in the region facing away from the backrest, and a detent pawl 15, which is arranged within the structural space and is mounted pivotably on a pawl bearing bolt 13, is provided on the fitting lower part 5. The detent pawl 15 and the toothed rim 12 are for interacting by toothed engagement depending on the relative position of the fitting parts 5 and 8.

A control cam 17 which, firstly, interacts with a control disc 18 of the fitting upper part 8, which disc is arranged around the backrest bolt 10, and, secondly, interacts with a clamping eccentric 23, is provided on the detent pawl 15 in a parallel plane. The essentially flat clamping eccentric 23 is mounted pivotably on a bearing bolt 25 of the fitting lower part 5 on that side of the detent pawl 15 which faces away from the toothed rim 12. In order to interact with the control cam 17, the clamping eccentric 23 has a clamping surface 23' which is curved eccentrically with respect to the bearing bolt 25. In the locked state of the latching fitting 1, a spring (not illustrated) presses the clamping eccentric 23 by way of the clamping surface 23' against the control cam 17, with the result that the detent pawl 15 is pressed with its teeth into the toothed rim 12 and is therefore secured when in use.

As a securing means in the event of a crash, an essentially flat intercepting element 27 is provided. The intercepting element 27 is likewise mounted in a spring-loaded and pivotable manner on the bearing bolt 25 in the same plane as the detent pawl 15, i.e. in a plane parallel to the clamping eccentric 23. The intercepting element 27 is normally arranged at a small distance from the detent pawl 15. In the event of a crash, a torque acts on the fitting upper part 8 which acts on the detent pawl 15 and, if appropriate, presses back the clamping eccentric 23. After a minimal pivoting movement, the detent pawl 15 is supported on the intercepting element 27 in such a manner that the toothed engagement between the detent pawl 15 and the toothed rim 12 is maintained.

An unlocking bolt 29, which engages through a slotted guide 31 of the clamping eccentric 23, is fitted on the intercepting element 27 parallel to the bearing bolt 25. The intercepting element 27 and the clamping eccentric 23 are connected via the slot and tenon guide formed in this manner. In order to unlock the latching fitting 1 when it is in use, the intercepting element 27 is pivoted back via the unlocking bolt 29 counter to its spring loading, in which case, after a dead movement via the slot and tenon guide, it pulls along the clamping eccentric 23, i.e. opens counter to its spring loading. During the further course of this movement, the intercepting element 27 carries along the detent pawl 15, with the result that the latter is opened and the latching fitting 1 is unlocked.

In order, in the event of a crash, to keep the opening moment on the clamping eccentric 23 as small as possible, the clamping eccentric 23 is mounted in a balanced manner on the bearing bolt 25. For this purpose, the clamping eccentric 23 has, at the same distance from the bearing bolt 25, two integrally formed, lug-like sections of material 33 which are arranged, with respect to the bearing bolt 25, on that side of the clamping eccentric 23 which faces away from the clamping surface 23'. On the side situated radially further outward, the sections of material 33 merge with a continuous transition into the clamping eccentric and then into one another, while on the other side a step-like, rounded transition is provided. The integral design together with the clamping eccentric 23 simplifies the production of the sections of material 33. Owing to the selected dimensions of the sections of material 33, the center of gravity of the clamping eccentric 23 lies precisely on the rotational axis of the clamping eccentric 23. In the event of a crash, the inertia of the clamping eccentric 23 does not cause a torque to be produced nor does it cause the latter to be transmitted to the intercepting element 27 via the connecting means. The intercepting element 27 is preferably balanced in a corresponding manner.

That which is claimed:

1. A locking device for a vehicle seat, the locking device comprising:
    at least two locking elements mounted so that:
        there can be relative movement between the locking elements, and
        the locking elements can be brought into engagement with one another to provide a locked state; and
    at least one securing element mounted:
        for pivoting about a rotational axis between at least first and second positions, and
        in a balanced manner with respect to the rotational axis,
    wherein:
        the securing element is for maintaining the locking elements in engagement with one another while the securing element is in the first position, and the securing element at least allows disengagement between the locking elements while the securing element is in the second position,
        a first of the locking elements is a detent pawl mounted for pivoting relative to a second of the locking elements,
        the securing element is a clamping eccentric having a curved clamping surface which engages the detent pawl to maintain the detent pawl and the second locking element in engagement with one another while the clamping eccentric is in the first position, and
        the locking device further comprises an intercepting element for holding the detent pawl in engagement with the second locking element in the event of a crash, wherein the intercepting element is mounted for pivoting about the rotational axis both with and relative to the clamping eccentric.

2. A locking device according to claim 1, wherein at least one section of material is integrally formed on the securing element as a balancing weight.

3. A locking device according to claim 2, wherein the section of material is a projection.

4. A locking device according to claim 3, wherein the securing element is flat.

5. A locking device according to claim 2, wherein:
    the section of material is a first section of material,
    the locking device further comprises a second section of material that is integrally formed on the securing element as a balancing weight, and
    the first and second sections of material are located at the same distance from the rotational axis.

6. A locking device according to claim 1, wherein the securing element is flat.

7. A locking device according to claim 1, wherein:
    at least one section of material is integrally formed on the securing element as a balancing weight;
    the rotational axis is positioned between the clamping surface and a side of the clamping eccentric which faces away from the clamping surface; and
    the section of material is located on the side of the clamping eccentric which faces away from the clamping surface.

8. A locking device according to claim 1, wherein the locking device is part of an adjusting device for the vehicle seat.

9. A locking device according to claim 1, wherein the locking device is part of an adjusting device that is in combination with the vehicle seat, the adjusting device is mounted to subassemblies of the vehicle seat for allowing relative movement between the subassemblies, and the locking device restricts relative movement between the subassemblies while the locking elements are in engagement with one another.

10. A fitting for a vehicle seat, the fitting comprising:
    a first fitting part mounted for pivoting about a first rotational axis relative to a second fitting part;
    at least two locking elements mounted so that:
        there can be relative movement between the locking elements,
        the locking-elements can be brought into engagement with one another to provide a locked state of the fitting in which the first fitting part is restricted from pivoting about the first rotational axis relative to the second fitting part, and
        the locking elements can be disengaged from one another to provide an unlocked state of the fitting in which the first fitting part can pivot about the first rotational axis relative to the second fitting part; and at least one securing element mounted:
  for pivoting about a second rotational axis between at least first and second positions, and
  in a balanced manner with respect to the second rotational axis,
wherein:
  the securing element is for maintaining the locking elements in engagement with one another, to provide the locked state, while the securing element is in the first position,
  the securing element at least allows the locking elements to be disengaged from one another, to provide the unlocked state, while the securing element is in the second position,
  the first fitting part includes a first of the locking elements,
  a second of the locking elements is a detent pawl mounted to the second fitting part for pivoting about a third rotational axis relative to the first locking element and the second fitting part,
  the first, second and third rotational axes are all spaced apart from one another,
  the securing element is a clamping eccentric having a curved clamping surface which engages the detent pawl to maintain the detent pawl and the first locking element in engagement with one another while the clamping eccentric is in the first position,
  the fitting further comprises a control disc mounted to the first fitting part for pivoting about the first rotational axis with the first fitting part,
  the detent pawl comprises a control cam that is for interacting with the control disc, and
  the curved clamping surface of the clamping eccentric engages the control cam of the detent pawl to maintain the detent pawl and the first locking element in engagement with one another while the clamping eccentric is in the first position.

11. A fitting according to claim 10, further comprising:
a bearing by which the clamping eccentric is mounted to the second fitting part for pivoting about the second rotational axis between at least the first and second positions; and
an intercepting element for holding the detent pawl in engagement with the first locking element in the event of a crash, wherein the intercepting element is mounted on the bearing for:
  pivoting about the second rotational axis, and
  there being relative pivoting about the second rotational axis between the intercepting element and the clamping eccentric.

12. A fitting according to claim 10, wherein the fitting is in combination with the vehicle seat, the first fitting part is mounted to a seat substructure of the vehicle seat, and the second fitting part is mounted to a backrest of the vehicle seat.

13. A fitting for a vehicle seat, the fitting comprising:
a first fitting part mounted for pivoting about a first rotational axis relative to a second fitting part;
at least two locking elements mounted so that:
  there can be relative movement between the locking elements,
  the locking elements can be brought into engagement with one another to provide a locked state of the fitting in which the first fitting part is restricted from pivoting about the first rotational axis relative to the second fitting part, and
  the locking elements can be disengaged from one another to provide an unlocked state of the fitting in which the first fitting part can pivot about the first rotational axis relative to the second fitting part; and
at least one securing element mounted:
  for pivoting about a second rotational axis between at least first and second positions, and
  in a balanced manner with respect to the second rotational axis,
wherein:
  the securing element is for maintaining the locking elements in engagement with one another, to provide the locked state, while the securing element is in the first position,
  the securing element at least allows the locking elements to be disengaged from one another, to provide the unlocked state, while the securing element is in the second position, and
  the first fitting part includes a first of the locking elements,
  a second of the locking elements is a detent pawl mounted to the second fitting part for pivoting about a third rotational axis relative to the first locking element and the second fitting part,
  the first, second and third rotational axes are all spaced apart from one another,
  the securing element is an intercepting element which engages the detent pawl in the event of a crash to maintain the detent pawl and the first locking element in engagement with one another while the intercepting element is in the first position,
  the detent pawl comprises a control cam, and
  the fitting further comprises:
    a control disc mounted to the first fitting part for pivoting about the first rotational axis with the first fitting part, wherein control cam is for interacting with the control disc,
    a bearing by which the intercepting element is mounted to the second fitting part for pivoting about the second rotational axis between at least the first and second positions, and
    a clamping eccentric mounted on the bearing for:
      pivoting about the second rotational axis between at least third and fourth positions, and
      there being relative pivoting about the second rotational axis between the intercepting element and the clamping eccentric,
    the clamping eccentric is for engaging the control cam to maintain the detent pawl and the first locking element in engagement with one another while the clamping eccentric is in the third position, and
    the clamping eccentric at least allows the detent pawl and the first locking element to be disengaged from one another while the clamping eccentric is in the fourth position.

14. A fitting according to claim 13, wherein the fitting is in combination with the vehicle seat, the first fitting part is mounted to a seat substructure of the vehicle seat, and the second fitting part is mounted to a backrest of the vehicle seat.

15. A locking device for a vehicle seat, the locking device comprising:
at least two locking elements mounted so that:
  there can be relative movement between the locking elements, and
  the locking elements can be brought into engagement with one another to provide a locked state; and at least one securing element mounted:
- for pivoting about a rotational axis between at least first and second positions, and
- in a balanced manner with respect to the rotational axis, wherein:
- the securing element is for maintaining the locking elements in engagement with one another while the securing element is in the first position, and the securing element at least allows disengagement between the locking elements while the securing element is in the second position,
- a first of the locking elements is a detent pawl mounted for pivoting relative to a second of the locking elements,
- the securing element is a clamping eccentric having a curved clamping surface which engages the detent pawl to maintain the detent pawl and the second locking element in engagement with one another while the clamping eccentric is in the first position,
- at least one section of material is integrally formed on the securing element as a balancing weight,
- the rotational axis is positioned between the clamping surface and a side of the clamping eccentric which faces away from the clamping surface, and
- the section of material is located on the side of the clamping eccentric which faces away from the clamping surface.

16. A locking device according to claim 15, wherein the locking device further comprises an intercepting element for holding the detent pawl in engagement with the second locking element in the event of a crash.

17. A locking device according to claim 15, wherein the locking device is part of an adjusting device for the vehicle seat.

18. A locking device according to claim 15, wherein the locking device is part of an adjusting device that is in combination with the vehicle seat, the adjusting device is mounted to subassemblies of the vehicle seat for allowing relative movement between the subassemblies, and the locking device restricts relative movement between the subassemblies while the locking elements are in engagement with one another.

* * * * *